UNITED STATES PATENT OFFICE.

ARNOLD CORTI, OF DÜBENDORF, NEAR ZURICH, SWITZERLAND.

PROCESS TO SEPARATE GLUTAMINIC ACID FROM OTHER AMINO ACIDS.

1,255,390.   Specification of Letters Patent.   Patented Feb. 5, 1918.

No Drawing.   Application filed December 8, 1916.   Serial No. 135,846.

*To all whom it may concern:*

Be it known that I, Dr. ARNOLD CORTI, a citizen of the Republic of Switzerland, residing at Dübendorf, near Zurich, Switzerland, have invented certain new and useful Improvements in Processes to Separate Glutaminic Acid from other Amino Acids; and I do hereby declare the following to be a full, clear, and exact description of the invention, such as will enable others skilled in the art to which it appertains to make and use the same.

As is already known, glutaminic acid, as well as a series of other amino acids, is obtained in the most simple manner by hydrolysis of albumins with mineral acids. In the hydrolysate it is combined as a salt with the solvent acid.

When using HCl for the purpose of isolating the glutaminic acid, it was hitherto usual to introduce hydrochloric acid gas into the hydrolysate, in order to convert into saturated hydrochloric acid the water which was left over from the hydrolysis and which dissolved the glutaminic acid-hydrochlorid; for by this saturation the hydrochlorid, which is insoluble in saturated hydrochloric acid, is precipitated.

This as well as the other usual processes, have several disadvantages, for example the escape of large quantities of hydrochloric acid gas and the production of undesirable motherlyes. Besides this process renders necessary the installation of a somewhat complicated plant for producing hydrochloric acid gas, which one has long wished to avoid.

The process hereinafter described removes these disadvantages. As is known, free glutaminic acid dissolves hardly in water; its solubility is 1:100. The glutaminic acid will therefore be separated from its solution in the hydrolysate by getting rid of the HCl, combined with it, as well as of the superfluous free HCl, which hinders the glutaminic acid-hydrochlorid from crystallizing in the diluted solution.

The process which is the subject of the present discovery may be carried out with advantage as follows:

After the albumins, which are suitable for this purpose, preferably those which give off a large quantity of glutaminic acid, have been subjected in a well known manner to hydrolysis, for example with hydrochloric acid, the acid solution is filtered while still hot and is neutralized with sodium carbonate, sodium bicarbonate, sodium hydroxid, calcium hydroxid or calcium carbonate, in short, with the hydroxids of alkali metals or alkaline earths or with the carbonates of alkali metals or alkaline earths, just enough that only the free hydrochloric acid and that combined with the amino acids is affected whereas the amino acids liberated from the albumin by hydrolysis are not acted on by the neutralizing agent.

The liquid is then cooled off and left to stand for some days. The glutaminic acid now separates in the form of a fine mud which still contains a small quantity of a black resinous matter. This mud must be separated as thoroughly as possible from the liquid either by filtering or by centrifugal action. In order to purify the raw glutaminic acid thus obtained the residue is dissolved with a sufficient quantity of hot water whereby the said resinous substance remains behind. This is filtered off. Thereupon some decolorizing charcoal is added, the solution is evaporated down to about a third and then filtered while hot, whereupon when it is cold the pure glutaminic acid is precipitated in the form of fine crystals, which are separated from the mother-lye by filtration. This mother-lye when further evaporated yields further crystals.

The mother-lye obtained by the mentioned neutralization with soda or the like contains the other amino acids and can be further treated to any desired extent.

Example: 150 liters of hydrochloric acid having a specific gravity of 1.19 are poured over 50 kilograms of wheat gluten and then heated in a closed vessel in the water bath for approximately 10 hours. The solution is then filtered and the filtrate gradually mixed with approximately 55 kilograms of calcined soda. The liquid is then cooled and after some days filtered.

The residue is dissolved in 500 liters of hot water and this solution immediately filtered. Then decolorizing charcoal (according to its decolorizing power) is added while stirring, then filtered and evaporated down to about 200–150 liters. When cold, approximately 10 to 12 kilograms of pure glutaminic acid in the form of fine crystals are deposited, which can be separated from the mother-lye by centrifugalizing it.

If the evaporation of this mother-lye is continued it will yield further crystals.

I claim—

1. The process of separating glutaminic acid from other amino acids, which consists in hydrolyzing albumins with mineral acid, filtering off the mineral acid solution, treating the latter with a neutralizing agent for the free and combined mineral acid, and separating the glutaminic acid.

2. The process of separating glutaminic acid from other amino acids, which consists in hydrolyzing albumins with mineral acid, filtering off the mineral acid solution, treating the latter with alkaline metal hydroxids sufficient to neutralize the free and combined mineral acid.

3. The process of separating glutaminic acid from other amino acids, which consists in hydrolyzing albumins with hydrochloric acid, filtering off the mineral acid solution, treating the latter with neutralizing alkaline metal compounds, sufficient to neutralize the free and combined mineral acid.

4. The process of separating glutaminic acid from other amino acids, which consists in hydrolyzing albumins with hydrochloric acid, filtering the acid solution, mixing the filtrate with calcined soda, and then cooling the mixture.

5. The process of separating glutaminic acid from other amino acids, which consists in hydrolyzing albumins with hydrochloric acid, filtering the acid solution while hot, mixing the filtrate with calcined soda, and then cooling the mixture.

6. The process of separating glutaminic acid from other amino acids, which consists in hydrolyzing albumins with hydrochloric acid, filtering the acid solution while hot, mixing the filtrate with calcined soda, then cooling the mixture, and filtering the latter.

7. The process of separating glutaminic acid from other amino acids, which consists in hydrolyzing albumins with hydrochloric acid, filtering the acid solution while hot, mixing the filtrate with calcined soda, then cooling the mixture, filtering the latter, dissolving the residue in hot water, filtering the resultant solution, stirring a decolorizing charcoal into the latter, filtering the decolorized solution, evaporating the latter, cooling the same to obtain crystallization, and separating the crystals from the mother lye by centrifugation.

8. A process of separating glutaminic acid from other amino acids, which consists in treating the mineral acid solution of glutaminic and other amino acids (obtained by hydrolysis of albumins with mineral acids) with a compound having an alkaline reaction in quantity sufficient only to neutralize the hydrochloric acid present in the free or combined state.

In testimony that I claim the foregoing as my invention, I have signed my name in presence of two subscribing witnesses.

ARNOLD CORTI.

Witnesses:
  CARL GUBECI,
  OLGA M. ORMIG.